(12) United States Patent
Matsuyuki et al.

(10) Patent No.: US 10,090,876 B1
(45) Date of Patent: Oct. 2, 2018

(54) ELECTRONIC DEVICES WITH MASKING LAYERS

(71) Applicant: Apple Inc., Cupertino, CA (US)

(72) Inventors: Naoto Matsuyuki, Tokyo (JP); James R. Wilson, Cupertino, CA (US); Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 15/170,631

(22) Filed: Jun. 1, 2016

Related U.S. Application Data

(60) Provisional application No. 62/275,555, filed on Jan. 6, 2016.

(51) Int. Cl.
*H04M 1/00* (2006.01)
*H04B 1/3888* (2015.01)

(52) U.S. Cl.
CPC ................... *H04B 1/3888* (2013.01)

(58) Field of Classification Search
None
See application file for complete search history.

(56) References Cited

U.S. PATENT DOCUMENTS

| | | | | |
|---|---|---|---|---|
| 6,322,875 B1 * | 11/2001 | Kimura | ............ | B44F 1/14 428/195.1 |
| 6,424,403 B1 * | 7/2002 | Leenhouts | ............ | G06F 3/041 349/12 |
| 7,364,649 B2 * | 4/2008 | Kunthady | ............ | H01H 13/14 205/118 |
| 7,411,143 B2 * | 8/2008 | Shin | ............ | H01H 13/7006 200/314 |
| 7,723,627 B2 * | 5/2010 | Hotta | ............ | H01H 13/785 200/314 |
| 8,059,329 B2 | 11/2011 | Song et al. | | |
| 9,099,409 B2 * | 8/2015 | Fujita | ............ | H01L 27/3211 |
| 2003/0102204 A1 * | 6/2003 | Shimizu | ............ | H01H 13/702 200/341 |
| 2005/0052871 A1 | 3/2005 | Leu et al. | | |
| 2008/0237921 A1 | 10/2008 | Butterworth | | |
| 2011/0199317 A1 * | 8/2011 | Kim | ............ | G02F 1/13338 345/173 |

(Continued)

FOREIGN PATENT DOCUMENTS

WO 2016007662 1/2016

*Primary Examiner* — Tuan A Tran
(74) *Attorney, Agent, or Firm* — Treyz Law Group, P.C.; G. Victor Treyz; Kendall W. Abbasi

(57) ABSTRACT

An electronic device may have transparent structures. The transparent structures may include a transparent member such as a transparent button member, a transparent member that serves as a display cover layer, a transparent member that covers a sensor such as a touch sensor, or other transparent member. The transparent member may have an inner surface that is covered with an opaque masking layer that is free of materials that discolor upon light exposure and that is formed from a layer of polymer and light-scattering inclusions such as solid particles, hollow microspheres, porous particles, and voids. A protective layer such as an inorganic layer may be formed over the polymer layer. A fingerprint sensor, touch sensor, or other structures may be attached to the opaque masking layer using a layer of adhesive.

18 Claims, 5 Drawing Sheets

(56) References Cited

U.S. PATENT DOCUMENTS

| | | | |
|---|---|---|---|
| 2012/0019900 A1 | 1/2012 | Kitson et al. | |
| 2012/0026107 A1* | 2/2012 | Kim | G06F 3/044 |
| | | | 345/173 |
| 2012/0222947 A1* | 9/2012 | Chang | H01H 13/83 |
| | | | 200/517 |
| 2014/0118661 A1 | 5/2014 | Qi et al. | |
| 2014/0124341 A1* | 5/2014 | Park | G06F 3/041 |
| | | | 200/293 |
| 2014/0239195 A1* | 8/2014 | Arimoto | C09K 11/55 |
| | | | 250/487.1 |
| 2015/0062709 A1* | 3/2015 | Matsuyuki | C03C 17/3417 |
| | | | 359/584 |

* cited by examiner

ELECTRONIC DEVICES WITH MASKING LAYERS

This application claims the benefit of provisional patent application No. 62/275,555 filed on Jan. 6, 2016, which is hereby incorporated by reference herein in its entirety.

FIELD

This relates generally to electronic devices and, more particularly, to masking layers for coating transparent structures in electronic devices.

BACKGROUND

Electronic devices sometimes contain transparent structures. For example, the display in a cellular telephone may be covered with a layer of glass. Cosmetic coatings such as layers of black and white ink are sometimes formed on the inner surfaces of the glass layer. In some devices, transparent button members may be coated with layers such as ink layers.

If care is not taken, the masking material that is used to coat a transparent structure in an electronic device may be prone to discoloration. For example, white ink layers that contain titanium oxide particles may acquire a bluish tint upon exposure to ultraviolet light.

SUMMARY

An electronic device may have transparent structures. The transparent structures may include a transparent member such as a transparent button member, a transparent member that serves as a display cover layer, a transparent member that covers a sensor such as a touch sensor, or other transparent members.

A transparent member in an electronic device may have an inner surface that is covered with a masking layer such as a layer of white ink or other white layer. The masking layer may be formed from a layer of polymer having light-scattering inclusions. The light-scattering inclusions may be formed from solid particles, porous particles, voids, hollow microspheres, or other structures that have an index of refraction that differs from that of the layer of polymer.

To prevent undesired color changes in the masking layer, the masking layer may be free of structures that discolor upon exposure to light. A protective layer such as an inorganic layer may be formed over the polymer layer to help prevent scratches. A fingerprint sensor, touch sensor, or other structures may be attached to the opaque masking layer using a layer of adhesive.

DETAILED DESCRIPTION

Electronic devices may be provided with opaque layers of material such as layers of polymer with light-scattering inclusions (e.g., ink). The opaque layers of material, which may sometimes be referred to as opaque masking layers, masking layers, or masking structures may be white, black, gray, or may have other suitable colors. Configurations in which the opaque layers are white layers may sometimes be described herein as an example. This is, however, merely illustrative. Masking layer coatings for electronic devices may have any suitable appearance.

Figure 1:
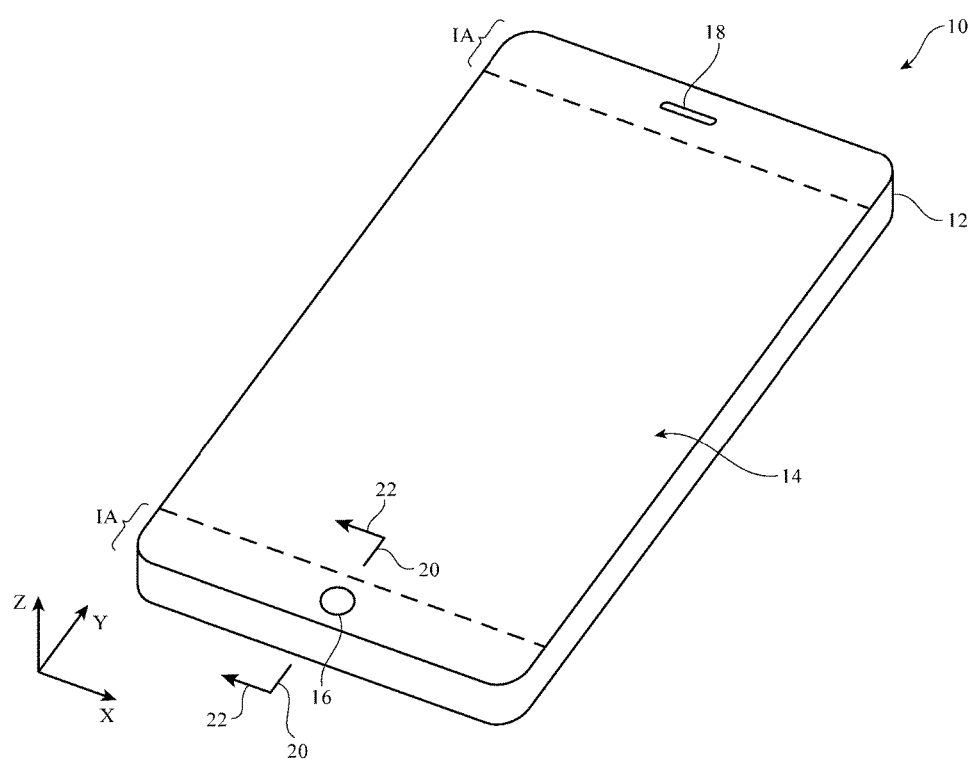
FIG. 1 is a perspective view of an illustrative electronic device in accordance with an embodiment.

FIG. 1 is a perspective view of an illustrative electronic device of the type that may include an opaque masking layer. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Openings may be formed in housing 12 to form communications ports, holes for buttons, and other structures.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 14 may include an array of pixels formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edges with a portion that is bent out of the plane of the planar main area, or other suitable shape. An opening may be formed in the display cover layer to accommodate ports such as speaker port 18.

One or more additional openings may also be formed in the display cover layer. For example, an opening may be formed in the display cover layer to accommodate a button such as button 16. Button 16 may be formed from a transparent button member that moves within the opening in the display cover layer. The button member may be circular, may be square, or may have other suitable shapes and may be formed from the same material as the display cover layer or other suitable materials. With one illustrative arrangement, which may sometimes be described herein as an example, button 16 may have a button member formed from a transparent layer such as a layer of sapphire. An opaque masking layer may be formed on the underside of the button member and on portions of the display cover layer for display 14 (e.g., on the inner surface of the display cover layer in inactive area IA of display 14). Other configurations may be used for display 14, if desired (e.g., button 16 may be formed from an integral region of the display cover layer, etc.).

Figure 2:
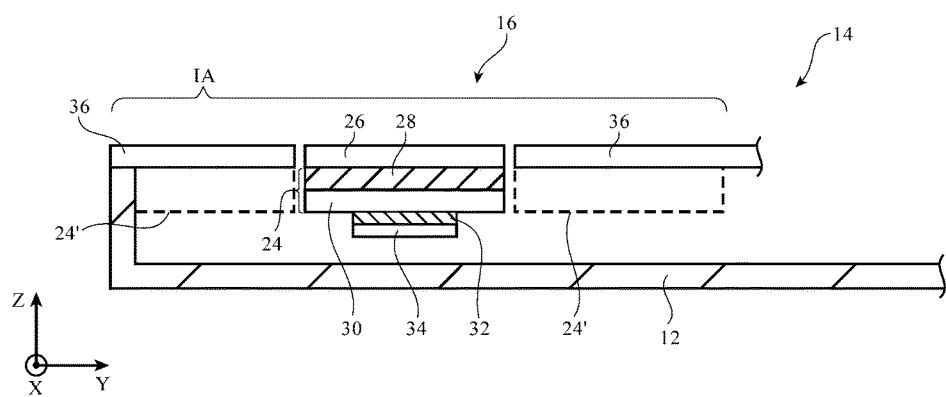
FIG. 2 is a cross-sectional side view of a portion of an illustrative electronic device with a button member in accordance with an embodiment.

FIG. 2 is a cross-sectional side view of a portion of device 10 of FIG. 1 in the vicinity of button 16 taken along line 20 of FIG. 1 and viewed in direction 22. As shown in FIG. 2, opaque masking structures (layer) 24 may be formed on the underside of button member 26 in button 16 and on the underside of display cover layer 36 (e.g., in the portions of display cover layer 36 shown by opaque masking structures 24' of FIG. 2 and inactive area IA of FIG. 1). Button member 26 may be transparent. Opaque masking layer 24 may block visible light. For example, opaque masking layer 24 may be a white layer that blocks internal components under member 26 from view. Layer 24 may be opaque or transparent at infrared wavelengths. Configurations for device 10 in which layer 24 is formed under a transparent member such as button member 26 may sometimes be described herein as an example. In general, masking layer 24 may be formed on the surface of any suitable structure in device 10.

Button member 26 may be formed from a transparent structure such as a layer of sapphire, glass, or plastic (as examples). During operation, a user may press against button member 26, causing button member 26 to move in the −Z direction (e.g., to actuate a tactile switch or other device under button member 26). To provide button 16 with the ability to gather user fingerprints, button 16 may have a sensor such as fingerprint sensor 34. Fingerprint sensor 34 may, for example, be a capacitive sensor (i.e., a capacitive touch sensor) that has an array of capacitive touch sensor electrodes. Sensor 34 may be formed from a semiconductor die (e.g., a silicon integrated circuit) and may be coupled to control circuitry within device 10 using a flexible printed circuit cable or other signal path. Sensor 34 may be mounted to the inner surface of opaque masking structures 24 using adhesive 32. Adhesive 32 may be a rigid adhesive such as a cured liquid adhesive (e.g., epoxy, a silicone-epoxy hybrid with a high cross-link density, etc.), may be a layer of pressure sensitive adhesive, or may be other suitable adhesive. If desired, button 16 may be formed from an integral portion of the display cover layer for display 14 and/or may have a strain gauge or other sensor for detecting when a user has pressed on button 16. The use of a configuration for button 16 with a movable button member and an associated tactile switch is merely illustrative.

Opaque masking structures 24 may include layers such as layers 28 and 30. Layers 28 and 30 may be formed as coating layers on the inner surface of button member 26 (and the inner surface of display cover layer 36 and/or other transparent structures in device 10). Layer 28 may be a light-scattering layer such as a layer of white ink, other white layer, or other opaque masking layer. Layer 30 may be a protective layer such as a layer of silicon oxide, a layer of silicon nitride, an oxynitride layer, other inorganic layers, or other protective structures on the underside of layer 28. Protective layer 30 may help prevent layer 28 from becoming scratched during assembly. If desired, protective layer 30 may be deposited using physical vapor deposition techniques (e.g., sputtering). The thickness of physical vapor deposition inorganic layer 30 may be less than 1 micron, less than 0.5 microns, less than 0.2 microns, less than 0.1 microns, more than 0.01 microns, or other suitable thickness. Layer 28 may be 0.5 to 50 microns thick, less than 25 microns thick, less than 10 microns thick, less than 5 microns thick, more than 1 micron thick, or other suitable thickness. Layer 28 preferably has a thickness that is sufficient to allow layer 28 to block internal components in device 10 from view by a user.

Layer 28 may be free of materials that discolor during exposure to light. Some white inks contain titanium dioxide particles. When exposed to light at wavelengths below the band gap of titania (e.g., ultraviolet wavelengths of less than 415 nm), surface defects may be induced in the titanium dioxide particles. This can create $Ti^{3+}$ ions and oxygen defect sights, leading to an undesired bluish appearance for the white ink. Although the presence of atmospheric oxygen at the surface of the titanium dioxide particles may help remove the bluish appearance, atmospheric oxygen may be prevented from reaching the titanium dioxide particles in some situations due to the presence of intervening layers of material (e.g., adhesive with limited oxygen permeability). Oxygen permeable adhesives may not always exhibit desired physical properties (i.e., these adhesives may be soft and not structurally sufficient for desired applications) and may therefore not be suitable for use in attaching structures to a white ink layer containing titanium dioxide particles.

To help avoid undesired discoloration, layer 28 may be free of materials that discolor under light exposure such as titanium dioxide. Layer 28 may be formed from a polymer matrix (binder) with light-scattering inclusions such as particles, bubbles, or other light-scattering features. These light-scattering inclusions may have dimensions of less than 50 microns, less than 25 microns, less than 10 microns, 2-15 microns, more than 1 micron, less than 5 microns, or other suitable sizes. To ensure that layer 28 has a desired appearance (e.g., a suitably white appearance when layer 28 is a white layer), layer 28 may include light-scattering features that are able to scatter light efficiently even in the absence of particles of titanium dioxide or in arrangements in which the density of particles of titanium dioxide is small. By using these light-scattering structures in layer 28, it is not necessary for adhesive layers in device 10 such as adhesive layer 32 to be formed from oxygen permeable materials (i.e., adhesive 32 may be a strong and rigid adhesive that is impermeable to oxygen).

Figure 3:
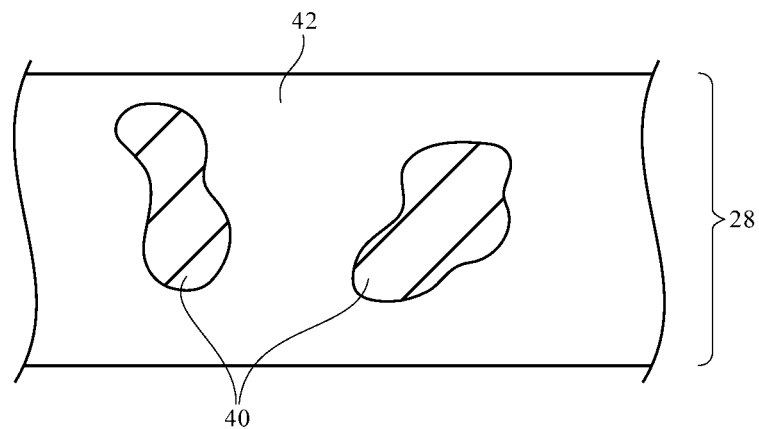
FIG. 3 is a cross-sectional side view of an illustrative masking layer with solid light-scattering particles in accordance with an embodiment.

With one illustrative arrangement, layer 28 has light-scattering inclusions formed from solid particles such as particles 40 of FIG. 3. Particles 40 and other light-scattering inclusions for layer 28 may be embedded within a layer of polymer such as polymer layer 42. Polymer layer 42 may be formed from a resin such as polyester, epoxy, acrylic, urethane, other polymer, or other binder material that forms a supporting matrix for particles 40. The index of refraction of layer 42 may be about 1.5-1.6 (as an example). Particles 40 may have an index of refraction that is lower than layer 42 or higher than layer 42. Incoming light (i.e., light that enters layer 28 from the exterior of device 10 after passing through button member 26 or other transparent member in device 10), may be scattered from particles 42 due to the mismatch between the index of refraction of particles 40 and the index of refraction of layer 42. Particles 40 may be formed from a transparent material (e.g., a dielectric) such as aluminum oxide, zinc oxide, tantalum oxide, other metal oxides, nitrides, other inorganic materials, organic materials, or other materials. The index of refraction of particles 40 preferably differs from the index of refraction of layer 42 by 0.1 or more, 0.2 or more, or 0.3 or more (as examples).

Figure 4:
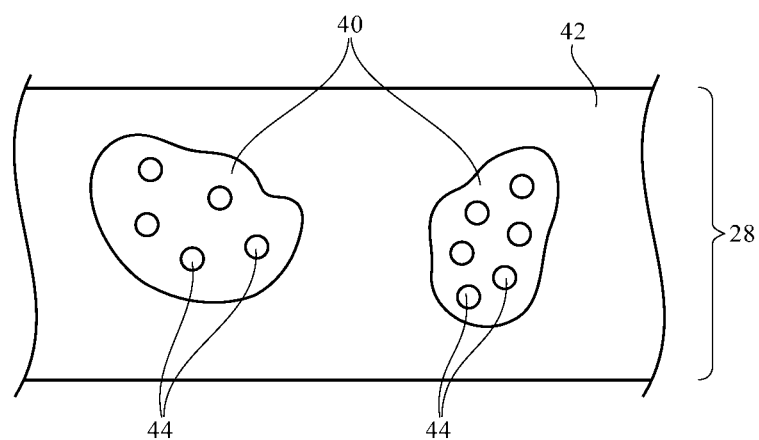
FIG. 4 is a cross-sectional side view of an illustrative masking layer with porous light-scattering particles formed from solid material containing cavities in accordance with an embodiment.

If desired, particles 40 may include voids such as voids 44 of FIG. 4 (i.e., particles 40 may be open-cell or closed-cell porous materials). Voids 44 in porous particles such as porous particles 40 of FIG. 4 may contain vacuum or may be bubbles that are filled with air, an inert gas such as nitrogen, or one or more other gasses, etc. Voids (pores) 44 may be less than 5 microns in diameter, 1-4 microns in diameter, more than 0.5 microns in diameter, or other suitable size. If desired, a mixture of particles 40 may be used in polymer 42, some of which are solid as described in connection with FIG. 3 and some of which are porous as described in connection with FIG. 4.

Figure 5:
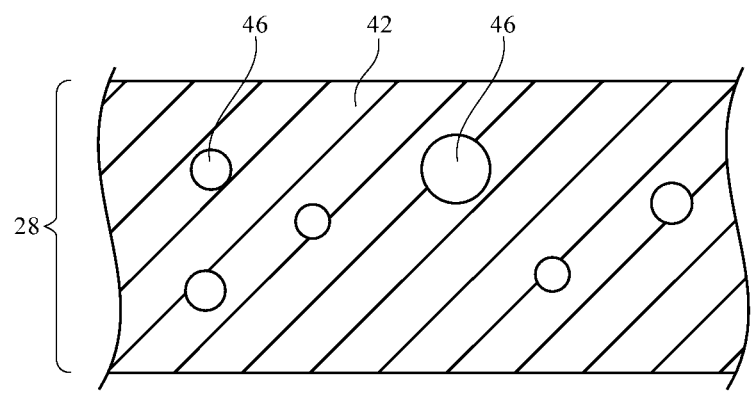
FIG. 5 is a cross-sectional side view of an illustrative masking layer with light-scattering voids in accordance with an embodiment.

FIG. 5 shows how polymer layer 42 may contain void 46 that serve as light-scattering features. Voids 46 may contain vacuum or may be bubbles that are filled with air, an inert gas such as nitrogen, or one or more other gasses, etc. Voids 46 may be less than 5 microns in diameter, 1-4 microns in diameter, more than 0.5 microns in diameter, or other suitable size. With one suitable arrangement, bubbles such as voids 46 of FIG. 5 may be incorporated into polymer 42 by omitting chemical additives that prevent the formation of foam (sometimes referred to as defoamers or anti-foaming agents). Polymer 42 that is free of defoamer material may be foamed to form voids 46 of FIG. 5 by introducing gas bubbles into polymer 42 while polymer 42 is a liquid and then curing polymer 42 before the bubbles coalesce. Polymer 42 may be cured by application of heat, light (e.g., visible light and/or ultraviolet light), at room temperature (e.g., when using a two-part adhesive), using a curing catalyst, etc.

Figure 6:
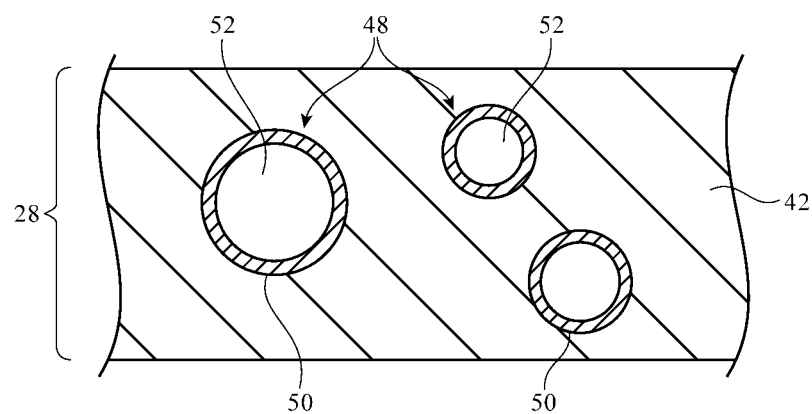
FIG. 6 is a cross-sectional side view of an illustrative masking layer with light-scattering hollow microspheres in accordance with an embodiment.

In the example of FIG. 6, hollow microstructures such as hollow microspheres 48 have been incorporated into polymer 42 to form layer 28. Each microsphere 48 may have a shell surrounding a void. Shells 50 may be formed from inorganic materials (oxides, nitrides, glass, etc.) or organic materials (e.g., polymer). Voids 52 may contain vacuum or a gas (nitrogen, air, etc.). The dimensions (diameters) of microspheres 48 may be less than 10 microns, 2-10 microns, less than 1 micron, more than 0.5 microns, more than 3 microns, or other suitable size.

If desired, other light-scattering inclusions may be incorporated into polymer layer 42 to form layer 28. Structures of the type shown in FIGS. 3, 4, 5, and 6 and, if desired, other light-scattering features may be incorporated into layer 42 in any suitable combination. If desired, the light-scattering features may be free of titanium dioxide and other materials that discolor under exposure to light such as ultraviolet light and/or may include minimal amounts of such materials.

Figure 7:
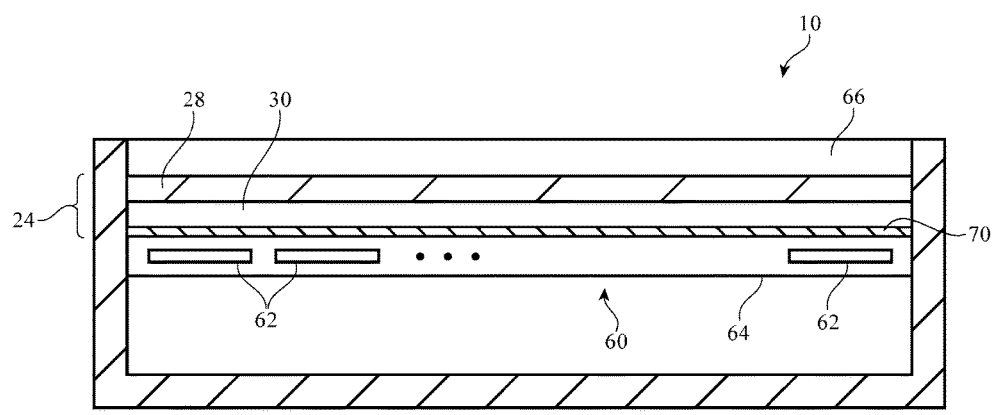
FIG. 7 is a cross-sectional side view of an illustrative electronic device with an opaque layer that is used to hide a touch sensor from view in accordance with an embodiment.

In addition to forming layers such as layer 28 between button member 26 and fingerprint sensor 34, layers such as layer 28 of FIGS. 4, 5, 6, and 7 may be incorporated under other transparent conductive structures (e.g., in regions 24' of FIG. 2). In the example of FIG. 7, device 10 is a trackpad or other device that includes a touch sensor such as touch sensor 60. Touch sensor 60 may be formed from an array of capacitive touch sensor electrodes (electrodes 62) supported by a substrate (substrate 64). Substrate 64 may be a dielectric material such as a molded plastic support structure or a printed circuit (e.g., a printed circuit with a substrate formed from rigid printed circuit board material such as fiberglass-filled epoxy or a printed circuit formed from a flexible substrate such as a layer of polyimide or other flexible sheet of polymer).

Touch sensor 60 may be mounted within the interior of device 10. For example, touch sensor 60 may be mounted to the underside of a protective outer member such as member 66. Planar member 66 may be a layer of transparent material such as a layer of clear plastic or glass. To help hide internal components in device 10 from view by a user (e.g., to help block touch sensor 60 from view from the exterior of device 10), an opaque masking layer may be formed on the inner surface of planar member 66. As an example, opaque masking layer structures 24 may be formed on the underside of planar member 66 and may be interposed between touch sensor 60 and member 66. Structures 24 may include an opaque layer with light-scattering features such as layer 28 and an optional protective layer such as layer 30. Optional adhesive layer 70 may be used to attach touch sensor 60 to structures 24.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
  a display having a pixel array;
  a housing;
  a transparent member in the housing, wherein the transparent member has an inner surface;
  opaque masking structures on the inner surface that contain light-scattering inclusions and that are free of materials that discolor on exposure to light, wherein the opaque masking structures do not overlap the pixel array; and
  a fingerprint sensor mounted under the opaque masking structures.

2. The electronic device defined in claim 1 wherein the opaque masking structures include a light-scattering layer and wherein the light-scattering inclusions are formed in the light-scattering layer.

3. The electronic device defined in claim 2 wherein the light-scattering layer is a white layer that is free of titanium dioxide.

4. The electronic device defined in claim 3 wherein the opaque masking structures include a protective layer on the white layer.

5. The electronic device defined in claim 4 wherein the white layer comprises a polymer layer having inclusions that are selected from the group consisting of: solid particles, porous particles, voids, and hollow microstructures.

6. The electronic device defined in claim 4 wherein the white layer comprises:
a polymer layer; and
solid light-scattering particles in the polymer layer.

7. The electronic device defined in claim 4 wherein the white layer comprises:
a polymer layer; and
porous light-scattering particles in the polymer layer.

8. The electronic device defined in claim 4 wherein the white layer comprises:
a polymer layer; and
light-scattering voids in the polymer layer.

9. The electronic device defined in claim 4 wherein the white layer comprises:
a polymer layer; and
light-scattering hollow microspheres in the polymer.

10. The electronic device defined in claim 4 wherein the transparent member comprises a button member.

11. The electronic device defined in claim 4 further comprising adhesive that attaches the fingerprint sensor to the opaque masking structures.

12. The electronic device defined in claim 11 wherein the protective layer comprises an inorganic layer.

13. The electronic device defined in claim 3 wherein the fingerprint sensor comprises a capacitive sensor attached to the white layer.

14. Apparatus, comprising:
a transparent member having an inner surface;
a light-blocking white layer on the inner surface of the transparent member, wherein the light-blocking white layer is free of titanium dioxide and is formed from a polymer layer containing light-scattering inclusions selected from the group consisting of: solid particles, porous particles, voids, and hollow microspheres; and
a capacitive sensor configured to make capacitive measurements through the transparent member.

15. The apparatus defined in claim 14 further comprising an inorganic protective layer on the light-blocking white layer, wherein the light-blocking white layer is interposed between the inorganic protective layer and the transparent member.

16. The apparatus defined in claim 15 wherein the capacitive sensor is attached to the protective layer with adhesive and wherein the light-scattering inclusions comprise solid particles with a different index of refraction than the polymer layer.

17. An electronic device, comprising:
a display having an active area and an inactive area;
a transparent button member in the inactive area, wherein the transparent button member has an inner surface;
a polymer layer on the inner surface of the transparent button member that contains light-scattering inclusions and that is free of titanium dioxide; and
a touch sensor that is attached to the polymer layer.

18. The electronic device defined in claim 17 further comprising an inorganic protective layer on the polymer layer and a layer of adhesive with which the touch sensor is attached to the protective layer.

* * * * *